United States Patent [19]

Wells

[11] Patent Number: 4,878,556
[45] Date of Patent: Nov. 7, 1989

[54] VEHICLE STEERING SYSTEMS

[75] Inventor: David L. Wells, Houston, Tex.

[73] Assignee: Stewart & Stevenson Services, Inc., Houston, Tex.

[21] Appl. No.: 96,163

[22] Filed: Sep. 11, 1987

[51] Int. Cl.[4] .............................................. B62D 7/14
[52] U.S. Cl. ...................................... 180/140; 280/91
[58] Field of Search ................... 180/140, 142; 280/91, 280/99

[56] References Cited

U.S. PATENT DOCUMENTS

| 3,007,537 | 11/1961 | Exley et al. | 180/140 |
|---|---|---|---|
| 3,392,987 | 7/1968 | Müller et al. | 280/91 |
| 3,414,286 | 12/1968 | Müller et al. | 280/91 |
| 3,446,307 | 5/1969 | Logus | 180/140 |
| 3,903,983 | 9/1975 | Yeske | 180/140 |

FOREIGN PATENT DOCUMENTS

| 648666 | 11/1962 | Italy | 180/140 |
|---|---|---|---|
| 132471 | 6/1986 | Japan | 180/140 |
| 53284 | 3/1987 | Japan | 180/140 |
| 11482 | 1/1988 | Japan | 280/91 |
| 334885 | 1/1959 | Switzerland | 180/140 |
| 1204455 | 1/1986 | U.S.S.R. | 180/140 |

OTHER PUBLICATIONS 12-page publication "Steering System Adjustment Procedure for T&TD-225 SL and T&TD-300 SL Paymovers"; International Harvester Co. of Chicago, IL.
1-page disclosure of Parker Hydraulic and Pneumatic Cylinder.
1-page (front and back) document "Model S-4R Rotary Mechanical Servo Valve by Olsen Controls, Inc. of Bristol, CT".
1 page of Atlas Fluid Control Corporation hydraulic directional control valve.
1 page entitled "Closed-center Hydraulic System", dated Aug. 1982.

Primary Examiner—Mitchell J. Hill
Attorney, Agent, or Firm—Pravel, Gambrell, Hewitt, Kimball & Krieger

[57] ABSTRACT

A steering system for a tow tractor having steerable front and rear road wheels is disclosed. The steering system comprises a steering wheel for turning the front road wheels and a hydraulic servo valve for turning the rear road wheels through an angle proportional to the turning of the front road wheels.

A rear mechanical push-pull cable is used for signaling a feedback angular quantity of the turning of the rear road wheels to the servo valve. A front mechanical push-pull cable is used for signaling an input angular quantity of the turning of the front road wheels to the servo valve. A hydraulic clutch is used for remotely engaging and disengaging the front mechanical system having at least two steering modes for the front and rear road wheels.

A method of operating a vehicle having mechanical controls for steerable front and rear road wheels is disclosed that eliminates the dangers of a failure mode inherent in an electronic control over hydraulic four-wheel steering device.

21 Claims, 3 Drawing Sheets

VEHICLE STEERING SYSTEMS

BACKGROUND OF THE INVENTION

1. Technical Field of the Invention

This invention relates generally to a steering system for a vehicle having steerable front and rear road wheels and methods for operating the steering system, more particularly, a hydraulic steering system for a vehicle having mechanical controls for steerable front and rear road wheels.

2. Description of the Prior Art

There are vehicle steering systems for steerable front and rear road wheels in common use. These steering systems are sometimes found on tow tractors for providing a three-mode, four-wheel steer vehicle. Such systems include a servo valve to control the turning of the steerable rear road wheels. In other words, the servo valve controls the hydraulics to the rear road wheels as a result of signals received for the turning from a microprocessor. The microprocessor receives both input electronic signals from a front road wheel sensor and feedback electronic signals from a rear road wheel sensor. The microprocessor compares both signals and energizes the servo valve to turn the rear road wheels either left or right as required to synchronize with the turning position of the front wheels.

This electronic steering system is operated full-time and is completely automatic. A three-position mode selector switch is provided in the operator's compartment to allow the operator to select one of the three modes of operation: (1) front wheels turn only, rear wheel straight ahead, (2) front and rear wheels turn the same angular direction (crab) and (3) the front and rear wheels turn at angles opposite to one another (coordinated).

The front wheels turning only mode for the electronic system is achieved by wiring the mode selector switch to a constant resistance to simulate the resistance of the front wheel sensor to a straight-ahead position. This electronic signal is sent continuously to the microprocessor with the microprocessor in turn sending current to the servo valve directing the rear wheels to be aimed straight ahead. The above coordinated mode is achieved by simply reversing polarity of the front wheel sensor.

These microprocessor based electric-over-hydraulic four-wheel steering systems use hydraulic pumps to position all four wheels. In every case, the front wheels are positioned hydraulically by using a hydraulic steering valve connected to the steering wheel to direct fluid to the desired front wheel cylinders.

A problem with this system occurs when moisture or water accumulates on any part of the circuit involving the wheel sensors. The rear road wheels may, without any input from the driver, go hard over left or right in a failure mode resulting from this moisture. This, of course, is quite dangerous for an operator or for the payload being towed by the tow tractor.

Another problem with these electronic systems occurs during cold-weather operation. The cold weather causes changes in electron flow producing undesired relative angular positioning of the rear and front road wheels. Also, steam cleaning of the microprocessor and sensors, degradation due to corrosion, broken wires, shorts, mechanical forces acting on the wheel sensor causing a change in resistance and mechanical wear-out of wiper arm on the wheel sensor are other serious problems experienced with this electric-over-hydraulic system.

Additionally, this electronic steering system requires trained electronic technicians with high precision electronic equipment. Since these electronic system failures are usually not visually detectable and are not intuitively obvious, field maintenance is more of a problem.

Additionally, the wheel sensors are located in the wheel wells on axle king pins, which makes adjustments to the wheel sensors difficult when the road wheel is on the vehicle. It has also been found that touching wires to ground when hooking up components "zapped" sensitive parts of microprocessor.

SUMMARY OF THE INVENTION

Briefly, according to the invention, an improved steering system for a tow tractor having steerable front and road wheels is provided. The steering system comprises a steering wheel for turning the front road wheels and a hydraulic servo valve for turning the rear road wheels through an angle proportional to the turning of the front road wheels. A rear mechanical push-pull cable is used for signaling an angular quantity or degree of the turning of the rear road wheels to the servo valve. A front mechanical push-pull cable is used for signaling an angular quantity of the turning of the front road wheels to the servo valve. A hydraulic clutch is used for remotely engaging and disengaging the front mechanical cable and the servo valve to provide a vehicle steering system having at least two steering modes for the front and rear road wheels.

According to the invention, a mechanical bell crank is provided for reversing the angular quantity or degree of the turning of the front road wheels received by the servo valve to provide a vehicle steering system having three steering modes for the front and rear road wheels.

The steering system of the present invention provides a method of operating a vehicle having mechanical controls for steerable front and rear road wheels while eliminating the dangers of the failure mode of the electronic over hydraulic four-wheel steering device.

This description of the invention is intended as a summary only. The claims of this patent, as construed in view of the specification, are intended to represent the scope of patent protection sought and obtained.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE PREFERRED EMBODIMENT

The mechanical controls of the present invention, indicated generally at 10, in FIGS. 1-5 are installable on a vehicle or conventional tow tractor.

HYDRAULIC STEERING SYSTEM

Figure 1:
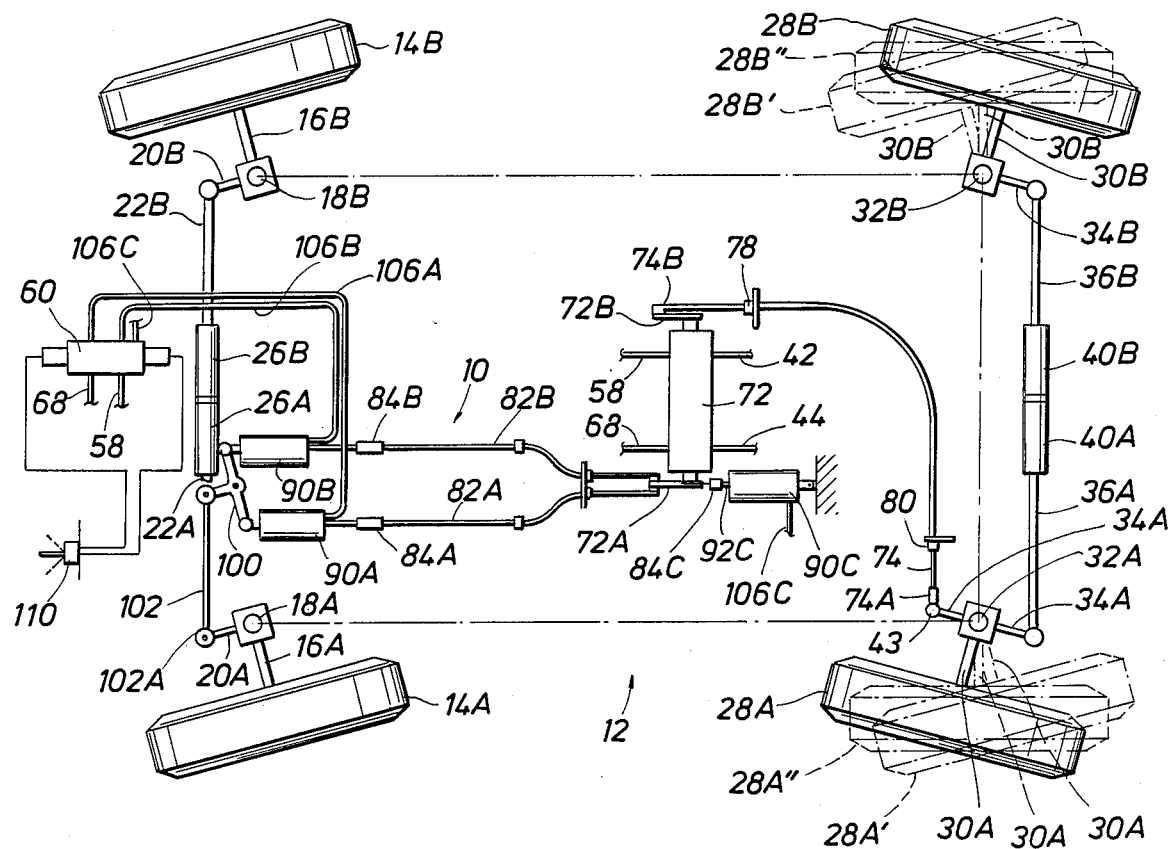
FIG. 1 is a plan view of the steerable front and rear road wheels and the mechanical controls of the invention installed on a vehicle for providing three steering modes.
Figure 3:
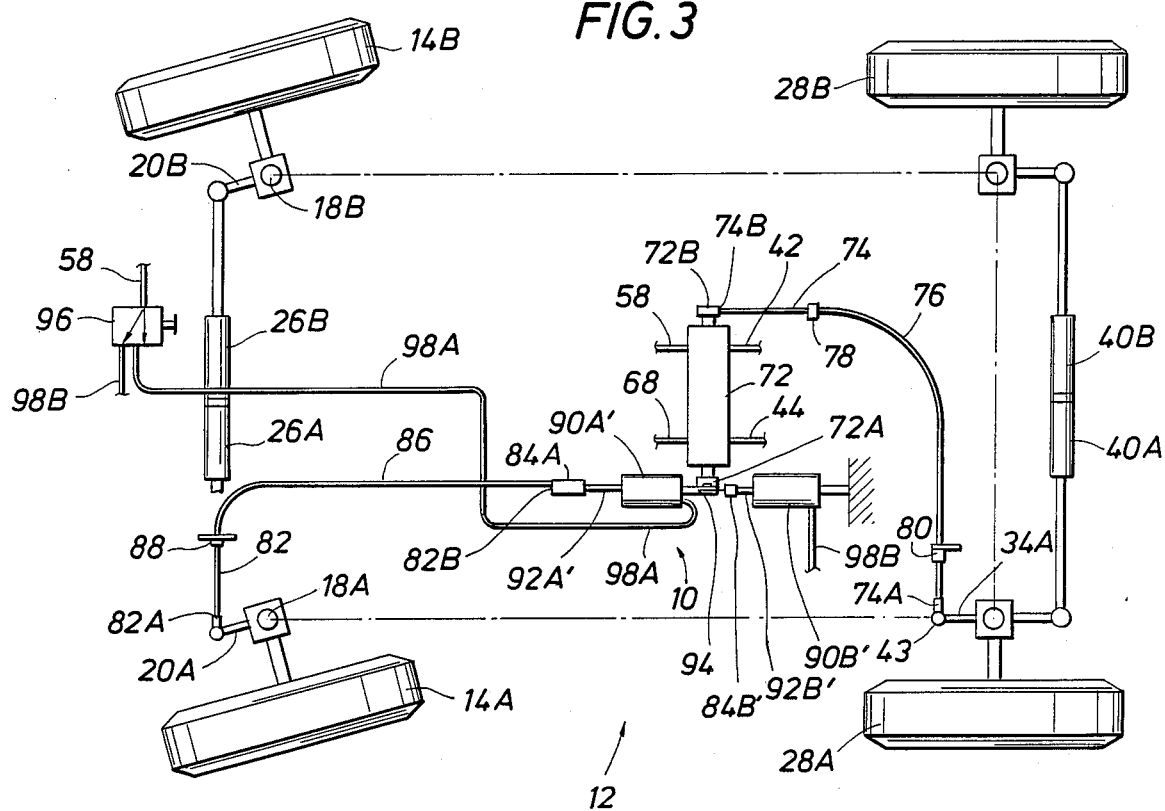
FIG. 3 is a plan view similar to FIG. 1 but showing a steering system for a vehicle having mechanical controls to provide only two steering modes.
Figure 5:
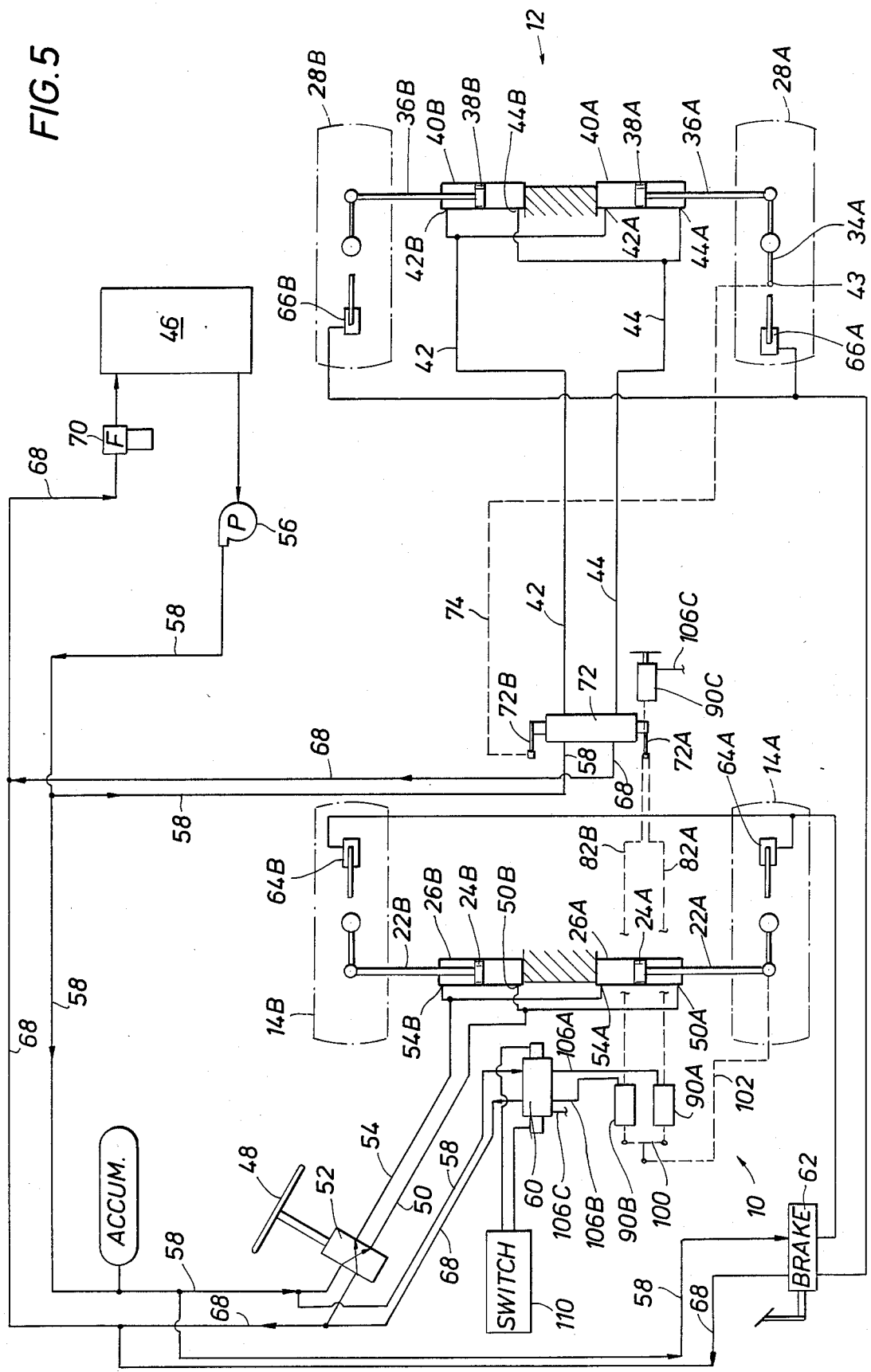
FIG. 5 is a schematic of the hydraulic steering system of the vehicle and the mechanical controls for the input and feedback signals to the hydraulic servo valve of the present invention.

The tow tractor, generally indicated at 12, in Figs. 1, 3 and 5 includes front road wheels 14A, 14B attached by respective shafts 16A, 16B to their respective front wheel pivots 18A, 18B. The front wheel pivots 18A, 18B are connected to their respective pivot cranks 20A, 20B which in turn are pivotably connected to their respective steering rods 22A, 22B. The steering rods 22A, 22B, as best shown in FIG. 5, are connected to their respective pistons 24A, 24B which respond to hydraulic pressure supplied in their cylinders 26A, 26B.

Turning now to FIG. 1, the rear road wheels 28A, 28B have a similar hydraulic steering system. The rear road wheels 28A', 28B' are shown in the crab position in phantom view relative to the front wheels 14. Additionally, the rear wheels 28A, 28B, shown with solid lines, are in the coordinated position with the front road wheels 14A, 14B. Finally, also shown in phantom view are the rear road wheels 28A'', 28B'' shown in straight-ahead position. Similar to the front steering system discussed previously, the rear wheels 28A and 28B include shafts 30A, 30B connecting the rear road wheels to respective rear wheel pivots 32A, 32B with respective cranks 34A, 34B, rods 36A, 36B and pistons 38A, 38B, as best shown in FIG. 5, in their cylinders 40A, 40B. The rear crank 34A includes a connection 43 for connecting with a mechanical push-pull cable 74, as will be discussed in detail below. FIG. 3 includes a similar hydraulic steering system, as discussed above, to the system shown in FIGS. 1 and 5.

As can best be seen in FIG. 5, when hydraulic line 42 connected to cylinders 40 is pressurized, the ports 42A, 42B of respective cylinders 40A, 40B will be pressurized causing the piston 38A to move outwardly turning wheel 28A for a right turn (clockwise rotation) and piston 38B will move inwardly causing rear road wheel 28B to also turn (clockwise rotation) to the right. Conversely, if hydraulic line 44 were pressurized, and hydraulic line 42 would vent back to tank 46 and ports 44A, 44B of respective cylinders 40A, 40B would be pressurized. This pressurization to ports 44A, 44B would push piston 38A inwardly turning rear road wheel 28A left (counterclockwise rotation) and push piston 38B outwardly turning rear road wheel 28B left (counterclockwise rotation).

Similarly, if the steering wheel 48 is turned to the right, the hydraulic steering valve 52 in the steering system will pressurize line 50 and piston 24B would move outwardly to turn front road wheels 14 right (clockwise rotation). If steering wheel 48 is turned to the left, the hydraulic steering valve 52 would vent line 50 and pressurize line 54 to ports 54A, 54B to move pistons 24 to turn the front road wheels 14 left (counterclockwise rotation).

Additionally shown in FIG. 5 is the hydraulic steering system including variable displacement pump 56 supplying hydraulic fluid from reservoir or tank 46 through line 58 to the hydraulic steering valve 52, the triple acting solenoid valve mode selector valve 60, the hydraulic brake valve 62 and the servo valve 72.

When the conventional brake valve 62 is actuated, the disc brakes 64A, 64B of the front road wheels 14 and the disc brakes 66A, 66B of the rear road wheels 28 are applied to stop the vehicle. Though the present invention shows the hydraulic system is used to operate the braking, steering, activation of the mode selector valve 60, and servo valve 72, independent hydraulic systems to each valve or a combination of the valves could be used. The braking, mode selection, servo valve and the steering valve are all vented through a common hydraulic line 68 through filter 70 back to tank 46. The operation and use of the servo valve 72 will be discussed in detail below.

Mechanical Rotary Proportional Feedback Valve

The proportional feedback servo valve 72 of the present invention is shown in FIGS. 1, 3 and 5. The hydraulic actuator or valve 72 provides a proportional flow control by use of rotary input and feedback signals. The valve 72 includes input lever 72A and feedback lever 72B. If the input lever 72A is moved forward, flow will preferably be directed to hydraulic steering line 42. When the feedback lever 72B moves forward to line up with the input lever 72A, flow will stop. If the input lever 72A is moved rearward, flow is directed to hydraulic steering line 44 and will continue until feedback lever 72B again lines up with input lever 72A. In other words, when the input lever 72A is rotated either rearward or forward, the feedback lever 72B will "chase it" until it lines up thereby stopping the flow of fluid into either lines 42 or 44.

Preferably, the flow rates can vary from 0 to 10 gallons per minute and the flow rate is proportional to the differential angle between the input lever 72A and the feedback lever 72B.

Therefore, it follows that if the input lever 72A were to be moved forward, the rear wheels 28 would turn clockwise, as the wheels shown in the solid lines in FIg. 1, and if the input lever 72A were moved rearward, the rear tires 28 would turn counterclockwise.

Conventional hydraulic mechanical four-way rotary servo valves are manufactured by Olsen Controls, Inc. of 664 Birch Street, Bristol, Conn. 06010; Atlas Fluid Controls Corp. of 5902 Royalton, Houston, Tex. 77081; and Ingersoll-Rand of P.O. Box 8738, Woodcliff Lake, N.J. 07675-8738.

Two-Mode Vehicle Steering System

Turning now to FIG. 3, the preferred embodiment for a two-mode steering system for a vehicle 12 having steerable front wheels 14 and rear wheels 28 is shown with mechanical controls 10 of the present invention. The preferred embodiment of the two-mode system includes a push-pull or bi-directional cable 74 having stainless steel spherical bearing rod ends 74A and 74B connected to respective connector 42 of the rear wheel pivot crank 34A and the feedback lever 72B of the mechanical rotary proportional feedback valve 72. The cable 74 preferably includes a protective sheath 76 about the cable 74 which is fastened to the vehicle at fasteners 78 and 80 to allow cable 74 to slidably move therein.

A front push-pull or bi-directional cable 82 having stainless steel spherical bearing rod ends 82A and 82B are connected to respective front wheel crank 20A and turnbuckle 84A'. A protective sheath 86 is provided between fixed fastener 88 and turnbuckle 84A' to allow the proper movement of cable 82. A coupling means or clutch 90A' for connecting and disconnecting the mechanical signal from the cable 82 is preferably provided in the mechanical controls 10. The clutch 90A' engages and disengages the mechanical push-pull cable 82 and the hydraulic actuator means or servo valve 72 to operably provide a vehicle steering system having at least two steering modes for the front and rear road wheels.

A clutch 90, is shown in detail view in FIG. 4, will be discussed in detail below. If the clutch 90A' is not pressurized, the cable 82 attached to rod 92A' is free to move longitudinally back and forth as in a lost motion connection. The fixed clevis 94, which is connected directly or indirectly to input lever 72A, would therefore not move since the rod 92A' is not transmitting the forces from the cable 82. Conversely, if the clutch 90A' were pressurized, the push-pull forces would be transmitted. A mode selector valve 96, as best shown in FIG. 3, could be connected to the hydraulic pressurized line 58, as best shown in FIG. 5, to provide the required pressurized fluid from line 58 to line 98A connected to clutch 90A'.

As shown in the preferred embodiment, the clutch 90A' is not pressurized. When the clutch 90A' is pressurized by line 98A, the clutch 90B' is vented through line 98B. The clutch or positioning means 90B' is secured at its clevis end to a fixed stationary member on the vehicle 12 and the rod 92B' is connected to turnbuckle 84B' which is in turn connected to the input lever 72A. When the clutch 90B' is pressurized, the clutch 90A' is vented to allow the rod 92B' to position the lever 72A in a straight up position. As discussed above, the feedback lever 72B would "chase" the input lever 72A while providing a flow of pressurized fluid to either line 42 or line 44. When feedback lever 72B is aligned with input lever 72A the valve 72 prevents flow to either lines 42 or 44 for positioning and maintaining the rear wheels 28 in the straight-ahead position. The fluid line 98B is shown in broken view for illustration purposes.

If clutch 90A' is pressurized and clutch 90B' is vented by valve 96, the push-pull forces would be transmitted and the rear wheels 28 would turn even during travel of the vehicle 12. If the front wheels 14 are turned counterclockwise and the clutch 90A' is pressurized, this would pull the lever 72A forward pressurizing line 42 thereby turning the rear wheels 28 clockwise in a coordinated mode.

Though not shown, a clutch could be positioned behind the servo valve 72 in the same position of clutch 90B' so that when it was activated it would pull the input lever 72A rearward turning the rear wheels 28 counterclockwise creating a crab mode for the vehicle. Alternatively, a front wheel pivot crank 20 could be extended rearward instead of forward, as pivot crank 20A in FIG. 3, to hook up with cable 82 to create a crab mode for the vehicle.

These mechanical controls 10 desirably provide a feasible retro-fit to existing electronic control steering systems, as discussed previously. The mode selector valve 96 could be tied into the existing hydraulic system, in particular line 58, to supply the fluid pressure necessary for the clutch 90A' or 90B' to achieve the two modes of operation.

Three-Mode Vehicle Steering System

Figure 2:
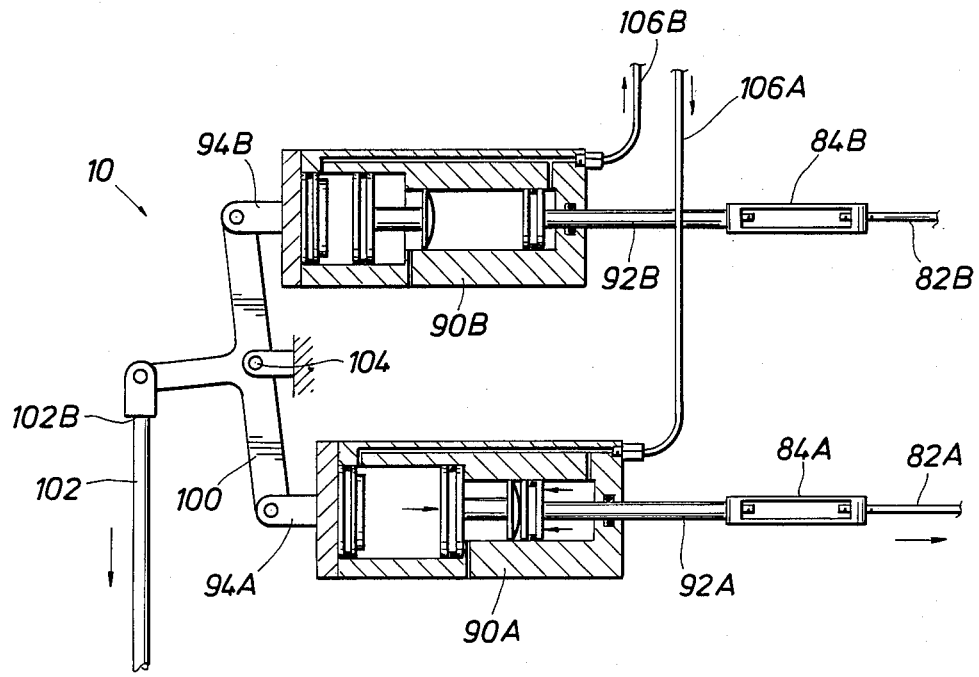
FIG. 2 is an enlarged detailed plan view of two clutch mechanisms, shown in section view, the bell crank and turnbuckles as shown in FIG. 1.

Turning now to FIGS. 1 and 2, the preferred embodiment of the three-mode steering system is provided. A push-pull cable 74 is disposed between the connector 42 and feedback lever 72B of servo valve 72 by stainless steel spherical bearing rod ends 74A and 74B. As best shown in FIG. 2, clutches 90A and 90B are shown with their clevis end 94A and 94B pivotably connected to bell crank 100. Rod 102 having spherical bearings rod ends 102A and 102B, respectively connected to the front axle pivot crank 20A and the bell crank 100. The bell crank 100 pivots about pivot 104 having a press bushing, as best shown in FIG. 2. The slidable rods 92A, 92B of clutches 90A, 90B are connected to respective turnbuckles 84A, 84B which in turn are connected to cables 82A, 82B. As can best be seen in FIG. 1, clutch 90A or 90B is pressurized by respective line 106A or 106B from a conventional triple-acting solenoid valve or mode selector valve 60 which is responsive to switch 110 for the three modes of steering. Valve 60 is spring centered to a 106C flow for automatic activation of the "front wheel only" mode.

When a clutch 90A or 90B is pressurized, the angular quantity of the turning of the front road wheels 14 is transmitted to the input lever 72A of servo valve 72. In the preferred embodiment shown in FIG. 1, the front wheels 14 are turning counterclockwise which pulls the rod 102 outwardly to push the cable 82A of pressurized clutch 90A rearward which in turn pushes input lever 72A rearward. This rearward movement of input lever 72A will pressurize line 44 to turn the rear wheels 28 counterclockwise, as the wheels 28A' shown in FIG. 1. Conversely, if clutch 90B were pressurized with the front wheels 14 still turned counterclockwise, the cable 82B would pull forward pressurizing line 42 to turn the wheels 28 clockwise at the same angular quantity as the front wheel 14A for a coordinated mode.

As can be seen the input signal from the front road wheels 14 is reversed by use of the bell crank 100. the servo valve 72 therefore automatically moves the rear wheels 28 in an opposite or reversed direction as the front wheels 14 to achieve a third mode of steering. Since the rear wheels 28 movement is also reversed, the feedback signal is correct for this reversed servo valve movement. Stated another way, using the ball crank or mechanical reversing means 100 in conjunction with the clutches 90A, 90B and cables 82A, 82B, the preferred embodiment for a three-mode steering system is provided by reversing the input signal, depending upon which cable clutch 90A or 90B is pressurized.

When switch 110 activates valve 60 in the "front wheel only" mode, fluid line 106C, shown in broken view, pressurizes positioning means or clutch 90C, which operates identical to the two mode clutch 90B' means, as discussed above. It is not necessary that the rear wheels be positioned in the straight-ahead mode when the switch 110 is in this "front wheel only" mode, as the servo valve 72 will position and maintain the rear wheels 24 in a straight-ahead position whether the vehicle is stopped or moving. The turnbuckle 84C allows adjustment between the rod 92C and the input lever 72A of the hydraulic actuator means 72. The positioning means or clutch 90C of the three mode embodiment and positioning means or clutch 90B' of the two mode embodiment, as shown in FIG. 3, are identical to the clutch 90, as shown in FIG. 4 and discussed below in detail.

Turnbuckles 84 allow the relative positioning of the front road wheels 14 and the rear road wheels 28 to be adjusted as desired by the operator. The turnbuckles are also accessible for ease in maintenance of the steering system. Turnbuckle 84 has one threaded bore with a left-hand thread and the other threaded bore has a right-hand thread.

Hydraulic Clutch or Positioning Means

Figure 4:
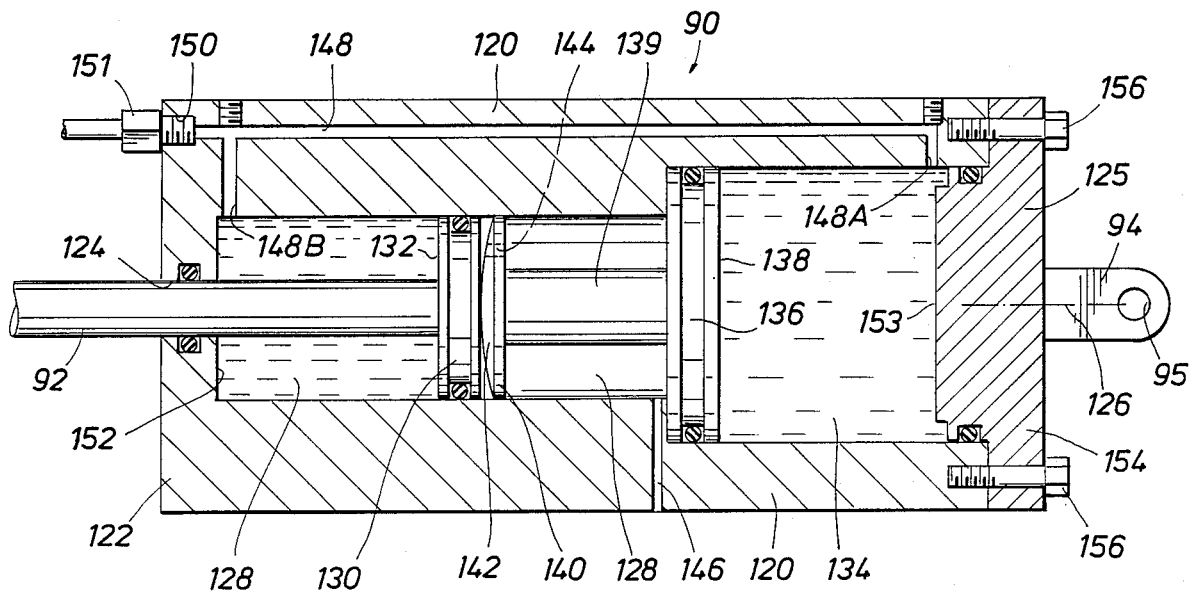
FIG. 4 is an enlarged detailed sectional view of the clutch mechanism shown in the figures.

Turning now to FIG. 4, the preferred embodiment of the positioning means, the hydraulic clutch or coupling means 90 is shown. For the three mode embodiment of Figs. 1 and 2, three clutches 90A, 90B and 90C are used, while only two clutches 90A' and 90B' are used for the two mode system of FIG. 3. The clutch 90 comprises a body 120 having a first or rod end 122 having an aperture 124 and a second or clevis end 125. The body 120 has a longitudinal axis 126 and includes a first chamber 128 having a first piston 130 slidable therein. The piston 130 has a pressure area 132, as defined by the area subject to the hydraulic fluid in the chamber 128.

The body 120 further includes a second chamber 134 having a second piston 136 slidably positioned therein and having a pressure area 138 subject to the hydraulic fluid in chamber 1334. The pressure area of the second piston 138 is greater than the pressure area of the first piston 132.

Rod 92 is fixably secured to the first piston 130 at one end and is slidably positioned with and through the first end aperture 124 at its other end. An arm 139 is fixedly secured to the second piston 136 at one end and engagable with the first piston 130 at the other end. Preferably the arm 139 includes a cylindrical disc like member 140 having a convex surface 142 for contact with the first piston 130. The member 140 includes a hole 144 therein to allow proper operation of the clutch 90. Additionally, a vent hole 146 is provided in the clutch 90 to prevent pressure lock during the operation of the clutch 90. A single fluid passage 148 is provided in the body 120 with a port 148A to the second chamber 134 and a port 148B to the first chamber 128. The hydraulic fluid is supplied in hydraulic pressure port 150 which would be connected to either lines 98A, 98B in the preferred embodiment shown in FIG. 3 or lines 106A, 106B or 106C, as shown in the preferred embodiment in FIGS. 1 and 2. All lines are fastened by securing nut 151.

When the clutch 90 is pressurized, the convex surface 142 of arm 138 engages the first piston 130 at a predetermined location, as shown in FIG. 4, along the longitudinal axis 126 to operably transmit a proportional angular degree or quantity of the turning of the front road wheels to the hydraulic actuator means 72 or lever arm 72A. Though the preferred embodiment illustrates pivot cranks 20 and 34 being equidistant from their respective pivots to their respective cable 82, rod 102 and cable 74 to enable a 1:1 proportional angular quantity, different relative lengths of cranks 20 and 34 could be used to achieve desired proportional angular quantity.

Alternatively, when the clutch 90 is not pressurized and is vented back to the tank by means of hydraulic line 68, as best shown in FIG. 5, the first piston 130 is slidable along the longitudinal axis 126 in either direction only to be restricted by stopping should 152 or when it comes in contact with the surface 142 of piston 136 when it contacts surface 153 of end cap 154 in its most rightward position inside the chamber 134. The stroke of the rod 92 of this lost motion connection is designed so that the rod 92 may disengage the signaling cable from the front road wheels to the hydraulic actuator means or servo valve 72 in any embodiment disclosed herein.

Preferably the O-rings as shown in the clutch 90 are buna-N O-rings and the clutch operates at a 0-2,500 psi operating pressure with hydraulic oil. The clutch's finish is annodized and the material preferably is aluminum alloy.

Preferably the end cap 154 includes 10 tapped holes equally space therearound to receive ten bolts 156 for securement of the end cap 154 with the body 120. Also, though not shown, the clevis 94 preferably includes two projecting clevis members having holes 95 aligned to receive a pin (not shown). The lever arm 72A preferably has an aligned aperture to receive the pin for securement of the clutch 90 to the servo valve 72 or other surfaces.

When used as a positioning means, if unpressurized, clutch 90 allows free movement of input lever 72A in response to the front signals. If pressurized, clutch 90 moves the input lever 72A to a predetermined straight-up location to operably move the rear road wheels 28 to a straight-ahead position.

Various modifications and alterations in the disclosed apparatus and methods will be apparent to those skilled in the art of the foregoing description which does not depart from the spirit of the invention. For this reason, these changes are desired to be included in the appended claims. The appended claims recite only the limitation to the present invention in the descriptive manner which is employed for setting forth the embodiments and is to be interpreted as illustrative and not limitive.

I claim:

1. In combination with a steering system for a vehicle having steerable front and rear road wheels of the type wherein a steering wheel for turning the front road wheels to an angular quantity, and a hydraulic actuator means for automatically turning the rear road wheels through an angle proportional to the turning of the front road wheels to operably provide a vehicle steering system having at least two steering modes for the front and rear road wheels, the improvement which comprises:

a rear mechanical means for signaling an angular quantity of the turning of the rear road wheels to said hydraulic actuator means, a first front mechanical means for signaling an angular quantity of the turning of the front road wheels to said hydraulic actuator means, said hydraulic actuator means turning the rear road wheels until said rear mechanical means signals said hydraulic actuator means that the angular quantity of the turning of the rear road wheels is equal to a proportional angular quantity of the turning of the front road wheels signaled by said front mechanical means to said hydraulic actuator means, and a first hydraulic coupling means for selectively engaging and disengaging said first front mechanical signaling means and said hydraulic actuator means to control the angular position of said rear wheels with respect to said front wheels.

2. Apparatus of claim 1 wherein said rear signaling means comprises a rear wheel pivot crank connected to one of the rear road wheels, and a push-pull cable disposed between said rear crank and said hydraulic actuator means to operably provide a feedback signal to said hydraulic actuator means.

3. Apparatus of claim 1 wherein said front signaling means comprises:
a front wheel pivot crank connected to one of the front road wheels, and
a push-pull cable disposed between said front crank and said hydraulic actuator means to operably provide an input signal to said hydraulic actuator means.

4. Apparatus of claim 3 further comprising:
turnbuckle means disposed between said front crank and said hydraulic actuator means for adjusting a relative angular position between the front road wheels and the rear road wheels.

5. Apparatus of claim 1 wherein said coupling means comprises a lost-motion connection.

6. Apparatus of claim 1 further comprising:
means for remotely selecting the desired steering mode for the front and rear road wheels.

7. Apparatus of claim 1 further comprising:
means for adjusting a relative angular position of said rear road wheels relative to said front road wheels.

8. Apparatus of claim 1 wherein said coupling means comprises:
a body having a first end having an aperture and a second end, said body having a longitudinal axis,
a first chamber disposed in said body,
a second chamber disposed in said body,
a first piston having a pressure area slidably positioned in said first chamber,
a second piston having a pressure area slidably positioned in said second chamber,
a rod fixedly secured to said first piston at one end and slidably positioned with said first end aperture at the other end,
an arm fixedly secured to said second piston at one end and engagable with said first piston at the other end,
a fluid passage in said body to said first chamber, and
a fluid passage in said body to said second chamber,
whereby when said coupling means chambers are pressurized said arm engages said first piston at a predetermined location along said longitudinal axis to operably transmit an angular quantity of the turning of the front road wheels to said hydraulic actuator means,
alternatively, when said coupling means chambers are not pressurized said first piston is slidable along the longitudinal axis to operably disengage the signaling means from the front road wheels to said hydraulic actuator means.

9. Apparatus of claim 1 further comprising:
a second front mechanical means for signaling an angular quantity of the turning of the front road wheels to said hydraulic actuator means, and
a second coupling means for engaging and disengaging said second front mechanical signaling means and said hydraulic actuator means.

10. Apparatus of claim 9 wherein said coupling means comprises a plurality of lost-motion connections.

11. Apparatus of claim 9 further comprising:
mechanical means connected to said first front and second front mechanical means for reversing the angular quantity of the turning of the front road wheels to said hydraulic actuator means.

12. Apparatus of claim 11 wherein the reversing means comprises a bell crank.

13. Apparatus of claim 11 further comprising:
means connected to said hydraulic actuator means for positioning said rear road wheels in a straight-ahead position.

14. Apparatus of claim 11 further comprising a pressurized hydraulic source to operably engage and disengage said first and second coupling means to provide three steering modes whereby
steering mode (a) is when said first coupling means is engaged and said second coupling means is disengaged said first front mechanical means provides an angular quantity of the turning of the front road wheels to said hydraulic actuator means to turn the rear road wheels proportional to the turning of the front road wheels,
steering mode (b) is when said first coupling means is disengaged and said second coupling means is engaged said second front mechanical means provides a reversed angular quantity of the turning of the front road wheels to said hydraulic actuator means to turn the rear road wheels proportional but opposite to the turning of the front road wheels, or, alternatively,
steering mode (c) is when said first and second coupling means are both disengaged neither said first front or said second front mechanical means provides an angular quantity of the turning of the front road wheels to said hydraulic actuator means to operably allow the positioning of the rear road wheels in a straight-ahead position,
said three steering modes of (a), (b) and (c) operably provide a vehicle steering system having a mechanical control for the steerable front and rear road wheels.

15. Apparatus of claim 14 further comprising:
means connected to said hydraulic actuator means for positioning said rear road wheels in a straight-ahead position
whereby in steering mode (c) said positioning means is pressurized by said hydraulic source to move the hydraulic actuator means to a predetermined location to operably position and maintain said rear road wheels in a straight-ahead position.

16. Apparatus of claim 1 further comprising:
means connected to said hydraulic actuator means for positioning said rear road wheels in a straight-ahead position.

17. Apparatus of claim 16 wherein said positioning means comprises:
a body having a first end having an aperture and a second end, said body having a longitudinal axis,
a first chamber disposed in said body
a second chamber disposed in said body,
a first piston having a pressure area slidably positioned in said first chamber,
a second piston having a pressure area slidably positioned in said second chamber,
a rod fixedly secured to said first piston at one end and slidably positioned with said first end aperture at the other end,
an arm fixedly secured to said second piston at one end and engagable with said first piston at the other end,
a fluid passage in said body to said first chamber, and
a fluid passage in said body to said second chamber, whereby when said positioning means chambers are pressurized said arm engages said first piston at a predetermined location along said longitudinal axis to move said hydraulic actuator means to a predetermined location to operably position and maintain said rear road wheels in a straight-ahead position, alternatively, when said positioning means chambers are not pressurized said first piston is slidable along the longitudinal axis to operably allow said hydraulic actuator means to move in response to said first or second front signaling means.

18. A method of operating a vehicle having steerable front and rear road wheels, comprising the steps of:

turning the front road wheels with a steering wheel, signaling an angular quantity of turning of the front road wheels to a hydraulic actuator means with a front mechanical means, automatically turning the rear road wheels with the hydraulic actuator means to an angular quantity proportional to the turning of the front road wheels when the front mechanical means is engaged, signaling an angular quantity of the turning of the rear road wheels to the hydraulic actuator means with a rear mechanical means, said hydraulic actuator means turning the rear road wheels until said rear mechanical means signals said hydraulic actuator means that the angular quantity of the turning of the rear road wheels is equal to the proportional angular quantity of the turning of the a front road wheels signaled by said front mechanical means to said hydraulic actuator means, and remotely engaging and disengaging the front mechanical signaling means to provide a vehicle steering system having at least two steering modes for the front and rear road wheels.

19. The method of claim 18 further providing the step of:

remotely mechanically reversing the angular quantity of the turning of the front road wheels to the hydraulic actuator means to operably provide a vehicle steering system having three steering modes for the steerable front and rear road wheels.

20. In combination with a steering system for a vehicle having steerable front and rear road wheels of the type wherein a steering wheel for turning the front road wheels, and a hydraulic actuator means for automatically turning the rear road wheels through an angular quantity proportional to the turning of the front road wheels, the improvement which comprises:

a rear mechanical means for signaling an angular quantity of the turning of the rear road wheels to said hydraulic actuator means, a front mechanical means for signaling an angular quantity of the turning of the front road wheels to said hydraulic actuator means, said hydraulic actuator means turning the rear road wheels until said rear mechanical means signals said hydraulic actuator means that the angular quantity of the turning of the rear road wheels is equal to a proportional angular quantity of the turning of the front road wheels signaled by said front mechanical means to said hydraulic actuator means, and mechanical means for reversing the angular quantity of the turning of the front road wheels to said hydraulic actuator means to operably provide a vehicle steering system having three steering modes remotely operated for the front and rear road wheels.

21. Apparatus of claim 20 further comprising:

a second front mechanical means for signaling an angular quantity of the turning of the front road wheels to said hydraulic actuator means, and a second coupling means for engaging and disengaging said second front mechanical signaling means and said hydraulic actuator means.

* * * * *